US009868109B2

(12) United States Patent
Cheng et al.

(10) Patent No.: US 9,868,109 B2
(45) Date of Patent: Jan. 16, 2018

(54) TITANATE / TITANIA COMPOSITE NANOPARTICLE

(75) Inventors: Yu Hua Cheng, Singapore (SG); Zhong Chen, Singapore (SG)

(73) Assignee: Nanyang Technological University, Singapore (SG)

( * ) Notice: Subject to any disclaimer, the term of this patent is extended or adjusted under 35 U.S.C. 154(b) by 1154 days.

(21) Appl. No.: 13/389,658

(22) PCT Filed: Aug. 11, 2010

(86) PCT No.: PCT/SG2010/000296
§ 371 (c)(1),
(2), (4) Date: Apr. 24, 2012

(87) PCT Pub. No.: WO2011/019322
PCT Pub. Date: Feb. 17, 2011

(65) Prior Publication Data
US 2012/0199468 A1    Aug. 9, 2012

Related U.S. Application Data

(60) Provisional application No. 61/232,939, filed on Aug. 11, 2009.

(51) Int. Cl.
*B01J 21/06* (2006.01)
*B01J 23/00* (2006.01)
(Continued)

(52) U.S. Cl.
CPC ........... *B01J 21/063* (2013.01); *B01J 23/002* (2013.01); *B01J 35/002* (2013.01); *B01J 35/004* (2013.01);
(Continued)

(58) Field of Classification Search
CPC .... C01G 23/04; C01G 23/043; C01G 23/047; B01J 21/063
(Continued)

(56) References Cited

U.S. PATENT DOCUMENTS 4,915,804 A * 4/1990 Yates et al. .............. 204/157.15
6,576,589 B1    6/2003 Han et al.
(Continued)

FOREIGN PATENT DOCUMENTS

| CN | 1903436 A | 1/2007 |
|---|---|---|
| CN | 1935668 A | 3/2007 |

(Continued)

OTHER PUBLICATIONS

Wang, Crystalline Transition from H2Ti3O7 Nanotubes to Anatase Nanocrystallines Under Low-Temperature Hydrothermal Conditions, 2006, J. Am. Ceram. Soc., 89, 3564-3566.*

(Continued)

*Primary Examiner* — Matthew E Hoban
*Assistant Examiner* — James Fiorito
(74) *Attorney, Agent, or Firm* — Alston & Bird LLP

(57) ABSTRACT

The present invention relates to a photocatalytically active nanoparticulate material. A nanoparticle of the invention is a composite nanoparticle having two crystalline phases: hydrogen titanate and titania, which are uniformly mixed in the nanoparticle. The invention also relates to forming a nanoparticulate composite material by heating a basic titania sol under solvothermal conditions.

25 Claims, 9 Drawing Sheets

(51) Int. Cl.
| | |
|---|---|
| B01J 35/00 | (2006.01) |
| B01J 35/02 | (2006.01) |
| B01J 35/10 | (2006.01) |
| B01J 37/02 | (2006.01) |
| B01J 37/10 | (2006.01) |
| B82Y 30/00 | (2011.01) |
| C01G 23/00 | (2006.01) |
| C01G 23/047 | (2006.01) |
| C02F 1/72 | (2006.01) |
| C02F 1/32 | (2006.01) |

(52) U.S. Cl.
CPC ......... *B01J 35/0013* (2013.01); *B01J 35/023* (2013.01); *B01J 35/1019* (2013.01); *B01J 37/0203* (2013.01); *B01J 37/10* (2013.01); *B82Y 30/00* (2013.01); *C01G 23/00* (2013.01); *C01G 23/047* (2013.01); *C02F 1/725* (2013.01); *C01P 2002/72* (2013.01); *C01P 2002/76* (2013.01); *C01P 2002/77* (2013.01); *C01P 2002/84* (2013.01); *C01P 2004/04* (2013.01); *C01P 2004/64* (2013.01); *C01P 2006/12* (2013.01); *C02F 1/32* (2013.01); *Y02W 10/37* (2015.05)

(58) Field of Classification Search
USPC .......................................... 423/610; 502/350
See application file for complete search history.

(56) References Cited

U.S. PATENT DOCUMENTS

| | | | |
|---|---|---|---|
| 7,553,474 B2* | 6/2009 | Ohmori et al. ............... | 502/350 |
| 7,763,149 B2* | 7/2010 | Maggard .................. | 204/157.15 |
| 2006/0104894 A1 | 5/2006 | Daoud et al. | |
| 2007/0202334 A1 | 8/2007 | Xie et al. | |
| 2009/0111687 A1* | 4/2009 | Gabriel et al. ................ | 502/300 |

FOREIGN PATENT DOCUMENTS

| | | |
|---|---|---|
| CN | 101422725 A | 5/2009 |
| JP | 6-157200 A | 3/1994 |
| WO | WO 2009/021292 A1 | 2/2009 |

OTHER PUBLICATIONS

Serpone N.; "Is the Band Gap of Pristine $TiO_2$ Narrowed by Anion-and Cation-Doping of Titanium Dioxide in Second-Generation Photocatalysts?"; Journal of Physical Chemistry B, 110 24287-24293, 2006.
Mrowetz M, Balcerski W, Colussi AJ, Hoffmann MR; "Oxidative Power of Nitrogen-Doped $TiO_2$ Photocatalysts under Visible Illumination"; Journal of Physical Chemistry B, 108, 17269-17273, 2004.
Riishiro R, Kato H, Kudo A.; Nickel and either tantalum or niobium-codoped $TiO_2$ and $SrTiO_3$ photocatalysts with visible-light response for $H_2$ or $O_2$ evolution from aqueous solutions; Physical Chemistry Chemical Physics 7, 2241-2245, 2005.
Fresno F, Guillard C, Coronado JM, Chovelon JM, Tudela D, Soria J, Herrmann JM; "Photocatalytic degradation of a sulfonylurea herbicide over pure and tin-doped $TiO_2$ photocatalysts"; Journal of Photochemistry and Photobiology A-Chemistry, 173, 13-20, 2005.
Colmenares JC, Aramendia MA, Marinas A, Marinas JM, Urbano FJ; "Synthesis, characterization and photocatalytic activity of different metal-doped titania systems"; Applied Catalysis A-General, 306, 120-127, 2006.
Asahi R, Morikawa T, Ohwaki T, Aoki K, Taga Y; "Visible-Light Photocatalysis in Nitrogen-Doped Titanium Oxides"; Science, 293, 269-271, 2001.

Cong Y, Chen F, Zhang JL, Anpo M; "Carbon and Nitrogen-codoped $TiO_2$ with High Visible Light Photocatalytic Activity"; Chemistry Letters, 35, 800-801, 2006.
Di Valentin C, Pacchioni G, Selloni A; "Theory of Carbon Doping of Titanium Dioxide"; Chemistry of Materials, 17, 6656-6665, 2005.
Umebayashi T, Yamaki T, Itoh H, Asai K; "Band gap narrowing of titanium dioxide by sulfur doping"; Applied Physics Letters, 81, 454-456, 2002.
Sakthivel S, Kisch H; "Daylight Photocatalysis by Carbon-Modified Titanium Dioxide"; Angewandte Chemie-International Edition 42, 4908-4911, 2003.
Sakthivel S, Kisch H; "Photocatalytic and Photoelectrochemical Properties of Nitrogen-Doped Titanium Dioxide"; Chemphyschem, 4, 487-490, 2003.
Tielens F, Calatayud M, Beltran A, Minot C, Andres J; "Lithium insertion and mobility in the $TiO_2$-anatase/titanate structure: A periodic DFT study"; Journal of Electro-Analytical Chemistry, 581, 216-223, 2005.
Sasaki T, Komatsu Y, Fujiki Y; "Protonated Pentatitanate: Preparation, Characterizations, and Cation Intercalation"; Chemistry of Materials, 4, 894-899, 1992.
Yang HG, Zeng HC; "Synthetic Architectures of $TiO_2/H_2Ti_5O_{11}$ $H_2O$, $ZnO/H_2Ti_5O_{11}$ $H_2O$, $ZnO/TiO_2/H_2Ti_5O_{11}$ $H_2O$, and $ZnO/TiO_2$, Nanocomposites"; Journal of American Chemical Society, 127, 270, 2005.
Zhang S, Chen Q, Peng L M; "Structure and formation of $H_2Ti_3O_7$ nanotubes in an alkali environment"; Physical Review B, 71, 14104, 2005.
Mills et al.; "Photobleaching of methylene blue sensitised by $TiO_2$: an ambiguous system"; Photochem. Photobiol. A: Chem. (1999) 127, 123.
Tang, Y, et al.; "Ultrafast Synthesis of Layered Titanate Microspherulite Particles by Electrochemical Spark Discharge Spallation"; Chem. Eur. J. (2010) 16, 7704.
Baiju, KV, et al.; "Hydrothermal processing of dye-absorbing one-dimensional hydrogen titanate"; Mater. Lett. (2009) 63, 923.
Zhu, HY, et al.; "Phase Transition between Nanostructures of Titanate and Titanium Dioxides via Simple Wet-Chemical Reactions"; J. Am. Chem. Soc. (2005) 127, 6730.
Kwiatkowska et al.; "An X-ray and Neutron Diffraction Study of $Cs_2Ti_5O_{11}$ and $Cs_2Ti_5O_{11}.X_2O$, X=H,D"; Acta Cryst. (1987) B43, 258.
Liu, G, et al.; "Band-to-Band Visible-Light Photon Excitation and Photoactivity Induced by Homogeneous Nitrogen Doping in Layered Titanates"; Chem. Mater. (2009) 21, 1266.
Matsumoto, T; "Fine Control of Nitrogen Content in N-doped Titania Photocatalysts Prepared from Layered Titania/Isostearate Nanocomposites for High Visible-Light Photocatalytic Activity"; Topics in Catalysis (2009) 52, 1584.
Joung, S-K, et al.; "Mechanistic Studies of the Photocatalytic Oxidation of Trichloroethylene with Visible-Light-Driven N-Doped $TiO_2$ Photocatalysts"; Chem. Eur. J. (2006) 12, 5526.
Agrios, A, & Pichat, P, J.; "Recombination rate of photogenerated charges versus surface area: Opposing effects of $TiO_2$ sintering temperature on photocatalytic removal of phenol, anisole, and pyridine in water"; Photochem. Photobiol. A. Chem. (2006) 180, 130.
Jiang et al.; "Solvothermal synthesis of N-doped $TiO_2$ nanotubes for visible-light-responsive photocatalysis"; Chem. Comms., 2008, p. 6372-6374.
Bavykin et al.; "Protonated Titanates and $TiO_2$ Nanostructured Materials: Synthesis, Properties, and Applications"; Adv. Mater., 2006, vol. 18, p. 2807-2824.
Li et al.; "Preparation of Mixed-Phase Titanium Dioxide Nanocomposites via Solvothermal Processing"; Chem. Mater., 2007, vol. 19, p. 1143-1146.
Pradhan et al.; "Atomic-Scale Structure of Nanosized Titania and Titanate: Particles, Wires, and Tubes"; Chem. Mater., 2007, vol. 19, p. 6180-6186.
Mao, Yuanbing and Wong, Stanislaus S.; "Size- and Shape-Dependent Transformation of Nanosized Titanate into Analogous Anatase Titania Nanostructures"; J. Am. Chem. Soc., 2006, 128, 8217-8226.

(56) References Cited

OTHER PUBLICATIONS

International Preliminary Report on Patentability from corresponding International Patent Application No. PCT/SG2010/000296 dated Jul. 20, 2011.
International Search Report and Written Opinion from corresponding International Patent Application No. PCT/SG2010/000296 dated Oct. 6, 2010.

* cited by examiner

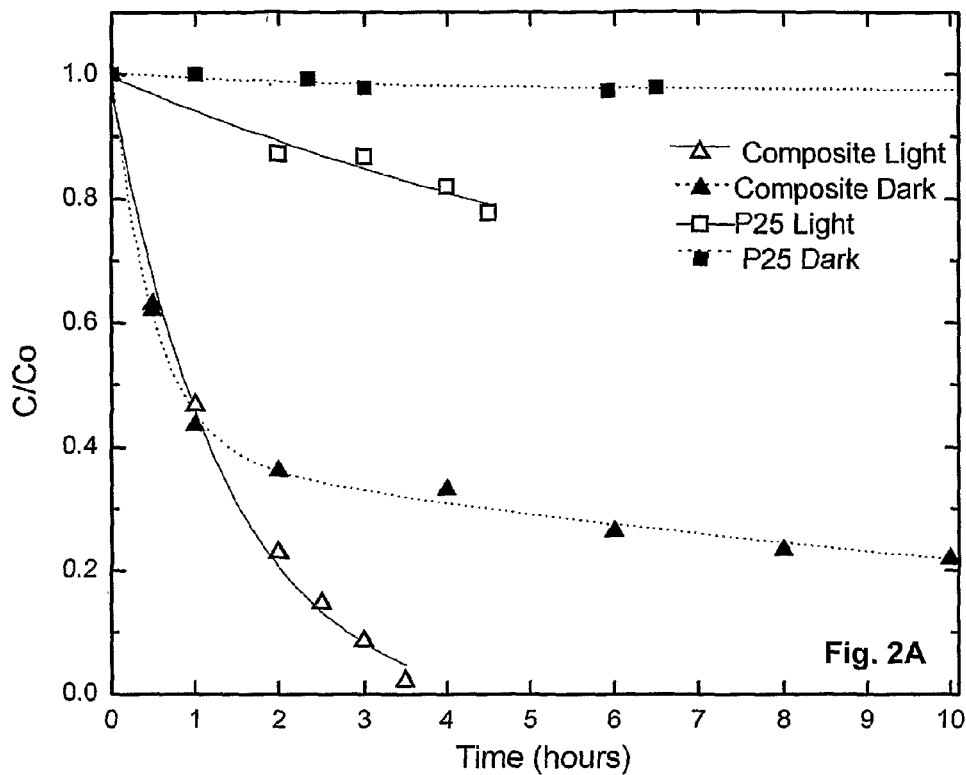
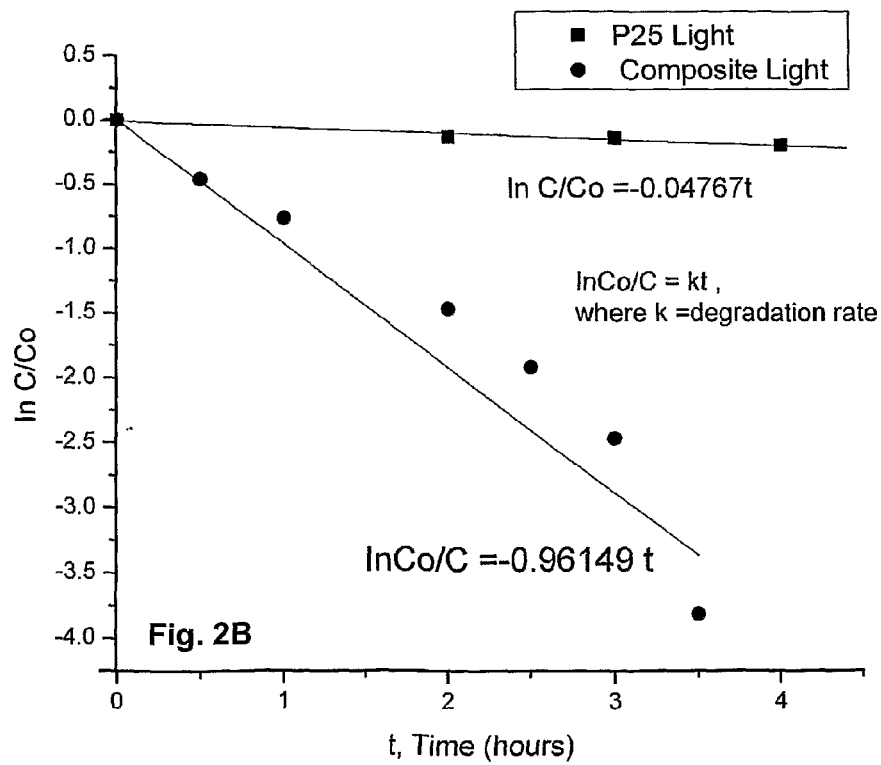

| | |
|---|---|
| Space-group | C 2/m (12) |
| a | 24.931(33) Å |
| b | 3.7079(56) Å |
| c | 10.255(23) Å |
| β | 123.11(14)° |
| V | 794.06(270) Å$^3$ |
| $R_{wp}$ | 9.1% |
| $R_p$ | 7.1% |
| $R_{exp}$ | 4.5% |
| $R_{bragg}$ | 3.9% |

| Atom | Wyck. | x/a | y/b | z/c |
|---|---|---|---|---|
| H1 | 4i | 0.41595 | 0 | 0.99762 |
| H2 | 4i | 0.45048 | 0 | 0.56749 |
| Ti1 | 4i | 0.23241 | 0 | 0.22797 |
| Ti2 | 4i | 0.18620 | 0 | 0.48041 |
| Ti3 | 4i | 0.15643 | 0 | 0.80512 |
| O1 | 4i | 0.18919 | 0 | 1.01820 |
| O2 | 4i | 0.33080 | 0 | 0.25864 |
| O3 | 4i | 0.16821 | 0 | 0.26659 |
| O4 | 4i | 0.27893 | 0 | 0.48729 |
| O5 | 4i | 0.10872 | 0 | 0.44156 |
| O6 | 4i | 0.22866 | 0 | 0.71562 |
| O7 | 4i | 0.07743 | 0 | 0.71948 |
| O8 | 4i | 0.04144 | 0 | 0.14419 |
| H3 | 4i | 0.08191 | 0 | 0.24410 |
| H4 | 4i | 0.01232 | 0 | 0.18308 |

| Temperature, dwelling time | Specific Surface Area ($m^2/g$) | Estimated titanate:anatase phase composition |
|---|---|---|
| 80°C, 1 week | 286.9993 | 100: 0 |
| 100°C, 3hrs | 224.6967 | 75: 25 |
| 130°C, 3hrs | 234.2081 | |
| 160°C, 3hrs | 179.749 | 46:54 |
| 170°C, 3hrs | 121.9455 | 24:76 |
| 200°C, 3hrs | 75.1043 | 0: 100 |
| P25 | 51.4449 | - |

TITANATE / TITANIA COMPOSITE NANOPARTICLE

CROSS REFERENCE TO RELATED APPLICATIONS

This application makes reference to and claims the benefit of priority of a provisional application for a "One-Step Low-Temperature Synthesis of Protonated Titanate/Titania Composite Nanoparticle Photocatalyst" filed on Aug. 11, 2009 with the United States Patent and Trademark Office, and there duly assigned Ser. No. 61/232,939. The content of said application filed on Aug. 11, 2009 is incorporated herein by reference for all purposes, including an incorporation of any element or part of the description, claims or drawings not contained herein and referred to in Rule 20.5(a) of the PCT, pursuant to Rule 4.18 of the PCT.

FIELD OF THE INVENTION

The present invention relates to a titanate/titania composite nanoparticle, as well as its use and its formation. The nanoparticle has a phase each of protonated titanate and titania, wherein these two phases are uniformly mixed in the composite nanoparticle.

BACKGROUND OF THE INVENTION

Photocatalysts are a unique class of semiconductor materials that absorbs light and catalyzes a reaction. They are currently widely studied in the area of environment and energy applications such as solar cells, photocatalytic hydrogen production ("water splitting"), waste water treatment, and chemical sensing. The current mission for the search for an ideal photocatalyst promises to be a difficult quest. The main requirements of these materials are that they possess appropriate electronic structures (band gap, band energy positions) for a maximum efficiency and productivity, be chemically stable in the application environment (accordingly non-toxic), and be reproducible in large quantity at low cost. It has been proven difficult to find semiconductors that satisfy the above criteria. For example, although many metal chalcogenides, such as sulfides and selenides, have low band-gaps and respond to or absorb visible light, they are easily corroded and often toxic, while the cost of production is substantial. In contrast, metal oxide semiconductors are environmentally benign, cheap to produce, and some of them are very stable in diverse environments. However, they are wide-band gap materials in their pristine state. Even the most successful oxide semiconductor in environmental applications, titanium dioxide ($TiO_2$), possesses a band gap of 3.2 eV (in its photocatalytically-preferred anatase form), making it sensitive only to UV light ($\lambda \leq 388$ nm). Since UV light only covers 5% or less of the solar spectrum, it makes the semiconductor photocatalyst inefficient.

As in photocatalysis, one of the major efforts in recent years has been to render titanium oxide responsive to visible light irradiation so as to increase its ability to harness the solar spectrum. This is achieved by the addition of dopants; traditionally metal cations, but more recently also non-metals or anions such as carbon, nitrogen, and sulphur. The latter is an attempt to reduce the width of the forbidden band, for example by raising the valence band or lowering the conduction band [Serpone, N, Journal of Physical Chemistry B (2006) 110 24287-24293], ideally without compromising redox functionality [Mrowetz, M, et al., Journal of Physical Chemistry B (2004) 108, 17269-17273].

So far the results on metal doping have been contradictory: both increase and decrease of photocatalytic activity have been reported [Riishiro, R, et al., Physical Chemistry Chemical Physics (2005) 7, 2241-2245; Fresno, F, et al., Journal of Photochemistry and Photobiology A-Chemistry (2005) 173, 13-20; Colmenares, JC, et al., Applied Catalysis A—General (2006) 306, 120-127]. The decrease may occur because the dopant behaves as a recombination centre and the energy levels formed by low-level doping can be discreet and lead to lower mobility of charge carriers. Up to today, the scientific community tends to support the view that metal doping is not a practical way to improve the catalytic activity of titanium oxide. This is not only due to ambiguous or unpredictable performance data, but also due to corrosion problems and prohibitive cost for some cationic dopants. Anion or non-metal doping has received increasing attention in recent years [Serpone, 2006, supra; Asahi, R, et al, SCIENCE (2001) 293, 269-271; Cong, Y, et al., Chemistry Letters (2006) 35, 800-801; Di Valentin, C, et al., Chemistry of Materials (2005) 17, 6656-6665; Umebayashi, T, et al., Applied Physics Letters (2002) 81, 454-456; Sakthivel, S, & Kisch, H, Angewandte Chemie Int. Ed. (2003) 42, 4908-4911; Sakthivel S, & Kisch H, Photocatalytic and photoelectrochemical properties of nitrogen-doped titanium dioxide, ChemPhysChem (2003) 4, 487-490; Tielens, F, et al., Journal of Electro-Analytical Chemistry (2005) 581, 216-223] as a promising alternative approach. Unfortunately, from a materials processing viewpoint, it is more difficult to achieve proper (homogeneous bulk) doping with anions as compared to cations. Successful procedures are generally vacuum-based, for example physical vapour deposition, chemical vapour deposition and ion implantation; all far too expensive for commercial viability.

Accordingly it is an object of the present invention to provide a material that can be used as a photocatalyst under visible light, overcoming at least some of the above discussed draw-backs.

SUMMARY OF THE INVENTION

In a first aspect the invention provides a composite nanoparticle with two phases uniformly mixed. This nanoparticle includes one phase of protonated titanate and one phase of titania (titanium dioxide), with these two phases uniformly mixed.

In a second aspect the invention relates to the use of a nanoparticle according to the first aspect as a photocatalyst.

In a related third aspect the invention provides a photocatalyst. The photocatalyst includes a nanoparticle according to the first aspect.

In a fourth aspect the invention provides a method of decomposing organic and/or biological matter. The method includes exposing the organic and/or biological matter to visible light or to UV light in the presence of the photocatalyst according to the second aspect.

In a fifth aspect the invention provides a method of manufacturing a composite protonated titanate/titania nanoparticle. The method includes forming under basic conditions a sol. The sol contains an oxide of a single metal. This metal oxide is a titanium oxide. The method further includes heating the sol under solvothermal conditions.

BRIEF DESCRIPTION OF THE DRAWINGS

The invention will be better understood with reference to the detailed description when considered in conjunction with the non-limiting examples and the accompanying drawings.

FIG. 2A depicts the first order degradation of 20 ppm Methylene Blue using composite photocatalyst (triangles) and Degussa P25 (squares). Solution was tested under dark conditions (black squares/triangles) and visible light irradiation (white squares/triangles). Change in concentration was measured with C being concentration at time t and Co as initial concentration at MB 20 ppm. The characteristic MB absorbance peak at 662 nm was observed to decrease with time.

FIG. 2B depicts the first order degradation of 20 ppm Methylene Blue where k represents the degradation rate.

FIG. 3D depicts the HRTEM image of FIG. 3C with colour saturation of the darker gray channel set to zero. Accordingly, the titanate phase appears light-coloured.

DETAILED DESCRIPTION OF THE INVENTION

Figure 1:
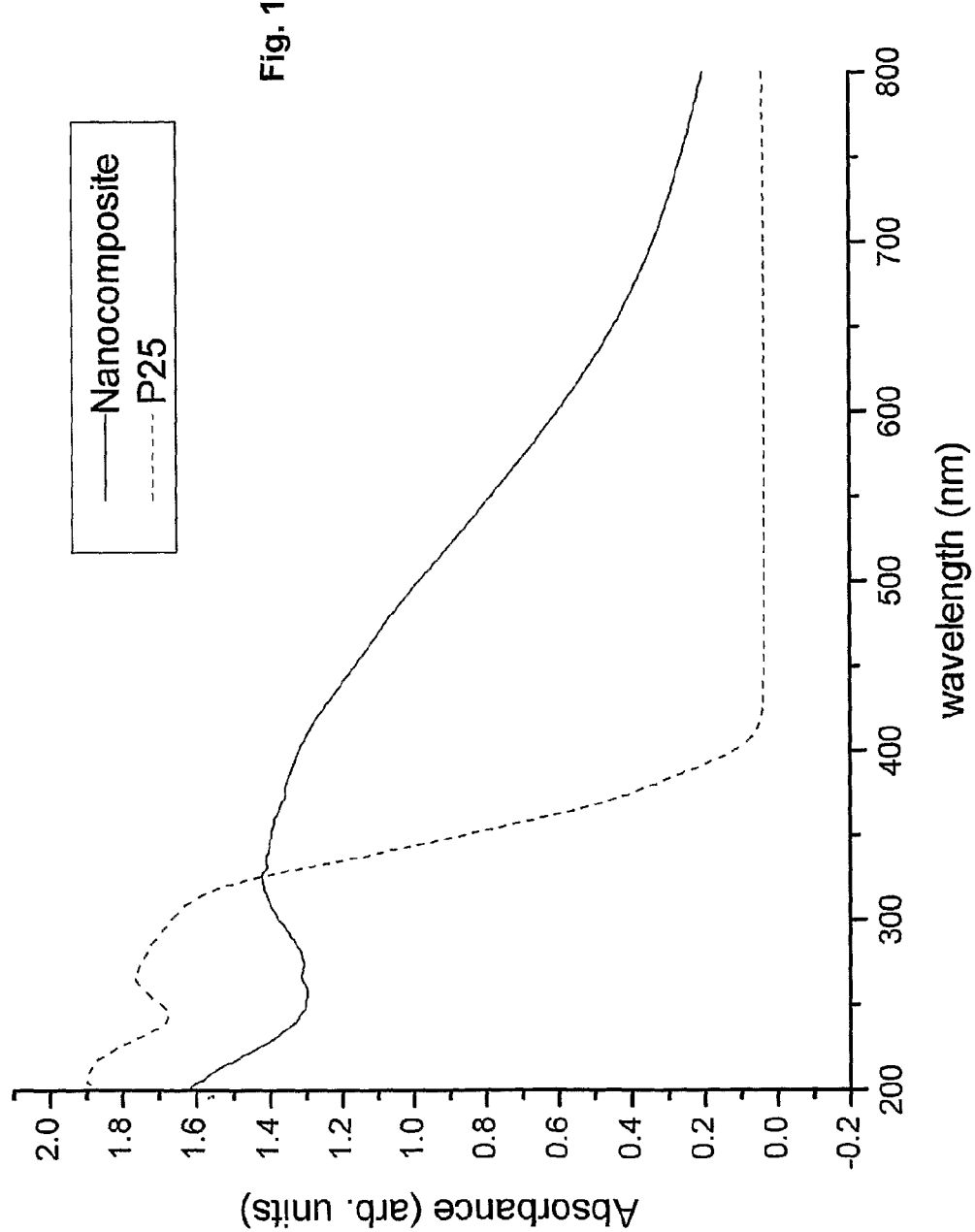
FIG. 1 shows a UV-Vis diffuse reflectance spectroscopy showing the extended absorption into the visible of the as-prepared composite protonated titanate/titania particles of the invention. As a comparison, the commercially available Degussa $TiO_2$ (P25) has an absorption edge below 400 nm.

The present invention provides a composite titania/titanate nanoparticle with two distinct constituent crystalline phases, one titania phase and one titanate phase. The two phases are uniformly mixed so that there are no morphologically distinct portions such as a core, a shell, a layer or a mantle can be distinguished from the residual nanoparticle. A nanoparticle of the invention thus appears morphologically unitary. Nevertheless the nanoparticle is a composite particle in that it contains both titania and titanate phases. Typically the nanoparticle has a crystalline titania phase and a crystalline titanate phase. A titania phase included in a nanoparticle of the invention is generally an anatase phase (anatase titania). The titanate included in the nanoparticle is protonated titanate, which may in the following also be referred to as hydrogen titanate. Generally, the protonated titanate is $H_2Ti_3O_7$ or $H_2Ti_5O_{11}.xH_2O$. The tinatate may be present in any crystalline phase, for example, a known crystalline phase of $H_2Ti_5O_{11}.xH_2O$ as reported by Yang H G, & Zeng H C, Journal of American Chemical Society (2005) 127, pages 270-278). As also explained below, the protonated titanate may also have a crystalline phase with a monoclinic configuration C12/ml. This monoclinic configuration may have lattice parameters a=24.931, b=3.7079, c=10.255 Å and β=123.11°. A nanoparticle of the invention is in some embodiments a nanocrystal. In some embodiments at least one non-crystalline phase, i.e. at least one amorphous phase, may be present in a nanoparticle of the invention.

A titania/titanate nanoparticle of the invention is a nanoparticle with essentially only titanium as a metal, albeit in an oxidized form. Other metals/metal oxides are either entirely absent or present only in traces. In typical embodiments titanium is the dominant metal present in the nanoparticle, with an amount of at least about 90%, at least about 94%, at least about 95%, at least about 96%, at least about 97%, at least about 98%, at least about 99% or at least about 99.5% of all metals, including any metal compounds such as metal oxide forms. Typically the nanoparticle of the invention is at least essentially free of other metals than titanium. As an illustrative example, in some embodiments a nanoparticle of the invention is at least essentially free of barium.

As explained above, chalcogenides or doped titanium dioxide have been used as photocatalysts. An alternative way to create efficient photocatalysts is to produce composite particles, with each constituent playing a different role in the mixture. Many researchers have explored the use of activated carbon particles as a strong absorbent, loaded with photocatalytic $TiO_2$ (doped or non-doped). However, the bottle neck of using activated carbon is that the respective black powders strongly absorb light and block the light penetration depth in a solution, which strongly affect the photocatalytic efficiency. These individual roles include reduction, oxidation, visible light sensitivity, and adsorption of the intended reactants.

A nano-sized particle according to the invention has mixed phases of protonated titanate (hydrate) and titania (in anatase form). The titanate phase may further include a dopant, for example an N dopant which makes it sensitive to visible light. The dopant can be present in any suitable amount that further improves the photocatalytic activity or properties of the nanoparticulate composite material of the invention. The dopant may, for example, be present, in a range from about 0.1 to about 10% atomic percent, for example 1%, 2%, 3%, 5%, 7%, 8% or 9% with respect to the titanate structure. The N dopant can be conveniently introduced using a solvothermal process as described here. In this context, it is noted that anatase titania per se is known to possess good photocatalytic activity but it is only sensitive to UV light, as explained above. The protonated titanate phase of the composite material of the invention can have a monoclinic layered crystal structure with exceptionally large interlayer spacing (~10 Å). The associated prospect of efficient intercalation [cf. Sasaki, T, et al., Chemistry of Materials (1992) 4, 894-899 in this regard] renders it useful for the separation and immobilization of dangerous species such as radioactive nuclides, and/or more effective photo-reduction of pre-adsorbed heavy metal cations. The inventors have surprisingly found that a composite nanoparticle of the invention possesses very good visible light sensitivity ($\lambda$=750 nm and even beyond, see FIG. 1) and superior adsorption of some model organic pollutants, as will be elaborated later. Such unique properties have not been reported previously, which makes the nanoparticles of the invention very useful for photocatalytic degradation of both organic and inorganic pollutants.

A nanoparticle of the invention is generally of a maximal width of about 2 nm to about 200 nm, such as about 2 nm to about 150 nm, about 5 nm to about 120 nm, about 5 nm to about 100 nm, about 10 nm to about 100 nm, about 5 nm to about 80 nm, about 10 nm to about 80 nm or about 10 nm to about 60 nm, e.g. about 10 nm, about 20 nm, about 30 nm or about 40 nm. The nanoparticle may be of any shape, such as a nanosphere, a nanorod or a nanocube.

The composite nanoparticle of the invention can comprise the two phases in each desired ratio, as long as the titania and the protonated titanate are present as two separates phases (which are uniformly mixed with each other). See FIG. 10 in this regard. This means, one phase can be present in an amount of about 99% with respect to the total composition whereas the other phase is present only in an amount of 1%. In exemplary embodiments, the particle has a phase composition of about 10 to about 90% protonated titanate and about 90 to 10% titania. In other embodiments the particle has a phase composition of about 25 to about 75 percent protonated titanate and about 75 to about 25% titania, or a phase composition of about 30 to 70% protonated titanate and about 70 to 30% titania, or a phase composition of about 40 to 50 percent hydrogen titanate and about 60 to 50% titania. In this context, it is noted that the phase composition can, for example, be derived from the measurement of the specific surface area (BET surface area). In specific embodiments of the composite material, the titania phase is anatase, and the protonated titanate is present as a monoclinic phase, for example a monoclonic phase with lattice parameters a=24.931, b=3.7079, c=10.255 Å and $\beta$=123.11° as described above.

In one aspect the present invention is directed to a nanoparticle such as a nanocrystal that is suitable as a photocatalyst operating under visible light (e.g., from about 380 nm to about 750 nm). It can be used in a variety of applications in which cheap and environmentally benign photocatalysts are needed to decompose organic and/or biological compounds. Photocatalytic decomposition works at room temperature, requires no additives and can lead to the complete oxidation of organic compounds to $CO_2$ and $H_2O$. A photocatalyst based on such nanoparticle will be applicable to photoremediate a wide variety of organics, microbes, viruses, and germs. In this regard a nanoparticle, or a nanoparticulate material, of the invention may be taken to combine the high catalytic activity of $TiO_2$ with the superior adsorptive properties of titanates which is, from the photocatalytic standpoint, highly beneficial, in particular since both potions are sensitized to visible light. As an illustrative example, a respective nanoparticle has been found by the present inventors to synergistically adsorb and degrade organic compounds such as methylene blue dye under visible light.

Organic material and/or biological material can be decomposed using the photocatalyst nanoparticle(s). Respective organic material may be or include any hydrocarbon based low molecular weight, oligomeric or polymeric compound. Respective biological material may be a cell, a fungus, a virus, or any non-vertebrate organism. Organic material and/or biological material may be exposed to the photocatalyst of the invention and to light, i.e. electromagnetic radiation. In particular, a medium (e.g., a liquid or gas) that includes the organic and/or biological material can be exposed to the photocatalyst of the invention and to light such as visible light (i.e., light having a wavelength from about 380 nm to about 750 nm). For instance, the medium can be, in particular embodiments, a liquid such as an aqueous solution, an aqueous suspension, or an aqueous dispersion.

In the present invention, a photocatalyst refers to a substance that shows catalytic activity when irradiated with light such as ultraviolet rays, and preferably, to a substance that, when irradiated with light, can decompose and eliminate various organic and inorganic compounds and perform sterilization. The titanium oxide-based photocatalyst of the present invention can be used for, for example, decomposing and eliminating odorous components such as acetaldehyde and methyl mercaptans; sterilizing and eliminating fungi and algae; oxidatively decomposing and eliminating nitrogen oxides; and imparting an anti-fouling function by causing glass to have ultra-hydrophilic properties.

Photocatalytic matter is capable of catalysing a chemical reaction, such as an oxidation. This capability is altered such as increased or activated when exposed to electromagnetic radiation such as light. Photocatalytic matter may for instance be inactive when not exposed to electromagnetic radiation, but its capability of catalysing a chemical reaction is accelerated or induced upon being exposed to electromagnetic radiation. Photocatalytic matter may also be capable of catalysing a chemical reaction when not exposed to electromagnetic radiation, with the respective capability being altered, typically increased, upon exposure to electromagnetic radiation. In typical embodiments, the photocatalytic matter becomes capable of catalysing a chemical reaction once exposed to electromagnetic radiation.

A respective chemical reaction typically results in degrading chemical compounds and/or biological material. For the purpose of the method of the present invention the photocatalytic matter should at least be capable of assisting or starting a chemical reaction that can be exploited to degrade a desired hydrophilic compound (see below). For this purpose there is in some embodiments no additional reagent required, in particular in embodiments where the photocatalytic matter catalyses a degradation reaction itself (see the Examples below for an illustration). As an illustrative example, where a nanoparticle of the invention is used as photocatalytic matter, an exposure to light, in particular visible light or UV light, causes the generation of active oxygen as a result of a photo redox reaction. The active oxygen is capable of oxidising matter in contact with or vicinity to the titanium dioxide. A standard method used in the art to assess the photocatalytic activity of matter of interest includes bringing 4-nitrophenol or rhodamine in vicinity or contact to the matter of interest, irradiating with e.g. UV light, and monitoring or determining the degradation of 4-nitrophenol or respectively rhodamine. Another standard method includes contacting water with the photocatalytic matter.

If a nanoparticle according to the invention is exposed to electromagnetic radiation it can catalyse the oxididation of oxidisable matter that is in contact therewith. Thus a nanoparticle of the invention or a plurality thereof, may be exposed to electromagnetic radiation. The respective radiation may be selected within any range of wavelengths of the electromagnetic spectrum. If desired, one distinct wavelength or a set of distinct wavelengths may be selected, or one or more defined regions of the electromagnetic spectrum. Examples of regions of the electromagnetic spectrum that may be chosen include, but are not limited to, visible light, ultraviolet light or infrared light. Visible light corresponds to a wavelength range of about 380 to about 750 nanometers, ultraviolet light corresponds to a wavelength range of about 10 to about 400 nanometers and infrared light corresponds to a wavelength range of about 700 nanometers to about 1 millimeter. In some embodiments a wavelength is for instance selected within the range of visible light (supra). In some embodiments a wavelength may be selected within the near UV (380 to 200 nm), and in some embodiments it is for instance selected within the far UV (200 to 10 nm). As an example, the wavelength may be selected to be 700 nm or shorter, including 600 nm or shorter or 400 nm or shorter.

The electromagnetic radiation may be of any intensity and the exposure of any length as long as it is sufficient to render the nanoparticle(s) capable of catalysing the desired reaction, e.g. an oxidation of selected oxidisable matter. Those skilled in the art will be aware of the fact that the required exposure time will depend on the power of the electromagnetic radiation used. In some embodiment one or more nanoparticles of the invention are accordingly used as a photocatalyst, for example a photocatalyst with anti-bacterial activity under natural and artificial light. Such a photocatalyst is suitable for both indoor and outdoor applications. The nanoparticle(s) can absorb sunlight in outdoor environments. It does not require UV light for electron-hole pair formation and hence is safe, clean, convenient and economical for a wide range of applications in common places such as hospital, offices, canteens, homes and toilets. In some embodiments a nanoparticle of the invention is used for cleaning waste water or for removal of natural organic matter and bacteria from water.

As emphasized, nanoparticulate material according to the present invention shows immense potential as a photocatalyst. In some embodiments it may be used for the photodegradation of harmful organic compounds, such as dyes as shown in the examples. This is one of the many environmental issues that are currently faced world-wide. The pollution of waters from inappropriate handling of unwanted dyes poses a threat to both human health and the environment. Using a suitable and efficient photocatalyst, the harmful organic compounds can be broken down and the water may be recycled for further uses. Moreover, the nanoparticulate material responds to visible light which makes it viable for effective use under solar light. As a further example, nanoparticulate material according to the invention may be used in the breakdown of organic wastewater. An illustrative example of a compound that may taken to define an organic pollutant and that may be degraded using nanoparticulate material according to the invention is phenol, as also illustrated in the Examples below. Also known as carbolic acid, phenol is an organic compound with the chemical formula $C_6H_5OH$. Sources of phenol include the discharges from chemical process industries such as paint, phenolic resins and plastics, oil refineries and herbicide production. When such waste discharge is improperly treated, the phenol content may be passed off as recycled water, entering the soil and re-entering water bodies. Phenol is extremely hazardous to humans in that death and severe toxicity could result from its effects on the central nervous system, heart, blood vessels, lungs and kidneys. Therefore, its effective removal is extremely important.

A method or a use of degrading organic or biological matter based on photocatalysis by a nanoparticle as defined above is particularly effective compared to known photocatalysts. A plurality of nanoparticles according to the invention, when used at 1 mg/ml, has an activity that achieves more than about 25% degradation of a 50 ppm phenol solution within 6 hours of visible light irradiation, which is the value achieved using P-25 titania (Degussa). Under these conditions nanoparticles according to the invention typically have a photocatalytic activity that achieves more than about 35%, more than about 40% degradation, more than about 50% degradation, more than about 60% degradation, more than about 70% degradation or more than about 80% degradation, including 85% degradation of a 50 ppm phenol solution within 6 hours of visible light irradiation. The phenol degradation is at least about 1.5 times, at least about twice, at least about 2.5 times or about 3 times faster than the degradation by $TiO_2$ of P-25 titania (Degussa).

A plurality of nanoparticles according to the invention, when used at a concentration of 0.1 mg/ml, has an activity that achieves more than about 20% degradation of a 20 ppm Methylene Blue solution within 3.5 hours of visible light irradiation, which is the value achieved using P-25 titania (Degussa). Nanoparticles according to the invention typically have a photocatalytic activity that achieves under these conditions more than about 30%, more than about 40% degradation, more than about 50% degradation, more than about 60% degradation, more than about 70% degradation, more than about 80% degradation, more than about 90% degradation or complete degradation of a 20 ppm phenol solution within 3.5 hours of visible light irradiation. The Methylene Blue degradation is at least about twice, at least about 3 times, at least about 4 times, at least about 5 times, at least about 6 times, at least about 7 times, at least about 8 times, at least about 9 times, at least about 10 times, at least about 12 times, at least about 14 times, at least about 16 times, at least about 18 times or about 20 times faster than the degradation by $TiO_2$ of P-25 titania (Degussa).

A photocatalyst based on one or more nanoparticles of the invention may also be applied in photocatalytic water splitting for hydrogen production, in a solar cell, chemical sensing, separation and immobilization of dangerous species, and photo-induced adsorption of heavy metal cations. More work is underway to explore the full potentials of this class of promising material.

Titania (titanium dioxide) is known to act photocatalytically by absorbing UV light to generate electron-hole pairs. These separated electrons and holes are then available to drive reduction and oxidation reactions respectively if electron-hole recombination is avoided. Degussa P-25 is a commonly used benchmark titania material that consists of 80% anatase and 20% rutile with a mean particle size of 30 nm. Nanoparticles of the present invention are capable of operating as a photocatalyst even when absorbing visible light. In addition nanoparticles of the invention have been found to be more effective photocatalysts than P-25 titania particles.

The invention provides a method of manufacturing a composite protonated titanate/titania nanoparticle in a single step solvothermal synthesis approach. This method allows to form, for example, the uniformly mixed composite nanoparticle according to the invention in a single step solvothermal synthesis approach. However, other nanoparticulate composite materials or even amorphous materials comprising a protonated titanate and a titania phase can also be formed using this process. Also these other materials have preferably photocatalytic activity. In the method of the invention a titania sol is provided as mentioned above. The sol used in the method of the present invention can be formed according to any protocol that employs a base as a catalyst. Using a base, for example, triethylamine or different amine (any suitable primary, secondary or tertiary amine can be used) as catalyst has the added advantage of doping, in a very convenient and easy manner, the composite material of the invention with an N-dopant (see Example Section). The titania sol may be formed from a precursor, for example in situ during the reaction process. This sol may for instance be generated by hydrolysis of a precursor such as a titanium alkoxide or a titanium halogenide such as titanium chloride or titanium fluoride. The hydrolysis of a titanium alkoxide as a precursor is thought to induce the substitution of OR groups linked to titanium by Ti—OH groups, which then lead to the formation of a titania network via condensation polymerisation. Examples of titanium alkoxides include for instance titaniummethoxide ($Ti(OMe)_4$), titaniumethoxide ($Ti(OEt)_4$), titaniumpropoxide ($Ti(OPr)_4$), titaniumisopropoxide ($Ti(Oi-Pr)_4$), titanium butanoxide ($Ti(OC_4H_9)_4$), titanium pentanoxide ($Ti(OC_5H_{11})_4$), titanium octanoxide ($Ti(OC_8H_{17})_4$), titanium isobutoxide ($Ti(OCH_2iPr)_4$), titanium 2-ethyl butoxide ($Ti(OCH_2CHEt_2)_4$), tetra 2-methoxyethyl titanate, titanium benzoxide or titanium cyclopentyloxide. Typically, but not limited thereto, sol preparation by hydrolysis of a titanium alkoxide can be performed in a mixture of water and a polar solvent such as a polar protic solvent, e.g. an alcohol such as ethanol or isopropanol. As noted above, a base-catalysed process is used, where for instance triethylamine, ammonia or ammonium carbonate may be employed as the base. The pH value in such a base-catalysed process is above 7.0, for instance in the range of about 8 to about 14, such as for example about pH 9, about pH 10, about pH 11, about pH 12 or about pH 13.

The method of the present invention further includes applying a solvothermal process under elevated temperature. A solvothermal process is a technique in which the reaction occurs in a pressure vessel that allows a solvent such as a polar solvent, e.g. water or an alcohol, to be heated to a temperature in excess of its normal boiling point. Pressure is applied at a preselected value, which is above 1 atm (about 0.1 MPa), such as up to about 5 atm, up to about 10 atm, up to about 20 atm, up to about 30 atm, up to about 40 atm, up to about 50 atm or higher. As the temperature inside the vessel increases during the reaction or the heating of suspension or solution, the interior pressure may also increase. In some embodiments, the interior pressure may also be maintained relatively constant by releasing the pressure buildup by venting or release the gas or air inside the chamber. In some embodiments, the interior pressure may also be adjusted so that it does not exceed a predetermined pressure value. In some embodiments, additional fluid such as inert gas or air may be introduced into the sealed chamber during or after the reaction to increase the interior pressure.

Any elevated temperature may be chosen that does not prevent a later formation of nanoparticles as defined above to occur. The increase in temperature may be generated by any means, including irradiation. In some embodiments the elevated temperature is within a range between about 80° C. and about 200° C., for example in the range of about 85° C. to about 190° C., such as of about 90° C. to about 190° C., about 90° C. to about 180° C., about 100° C. to about 170° C., about 110° C. to about 150° C., about 100° C. to about 150° C., about 120° C. to about 190° C. or about 90° C. to about 150° C. In some embodiments the elevated temperature is about 100° C., about 120° C., about 130° C. or about 140° C. The period of time during which the sol is exposed to this temperature may be selected from about 30 min to about 12 hours, including about 1 to about 6 hrs, e.g. about 2 hours, about 3 hours, about 4 hours, about 5 hours, about 6 hours, about 7 hours or more. Before this temperature is reached, the temperature in the vessel may be gradually increased over a preselected time interval, if desired. This time interval may be in the range of minutes to days, including hours. The preselected time interval may for example be about 5 minutes, about 10 minutes, about 15 minutes, about 20 minutes, about 25 minutes, about 30 minutes, about 35 minutes, about 40 minutes, about 45 minutes, about 50 minutes, about one hour, about 2 hours, about 3 hours, about 5 hours, about 6 hours, about 8 hours, about 10 hours, about 12 hours, about 15 hours, about 20 hours, about 24 hours, about 32 hours, about 48 hours, about 3 days, about 4 days, about a week or more. Subsequently the obtained one or more nanoparticles may be dried, whereby the solvent is removed. Any suitable period of time and temperature may be selected for drying as long as the particulate structure of the nanoparticles photocatalytic properties.

Figures 8, 9, 10:
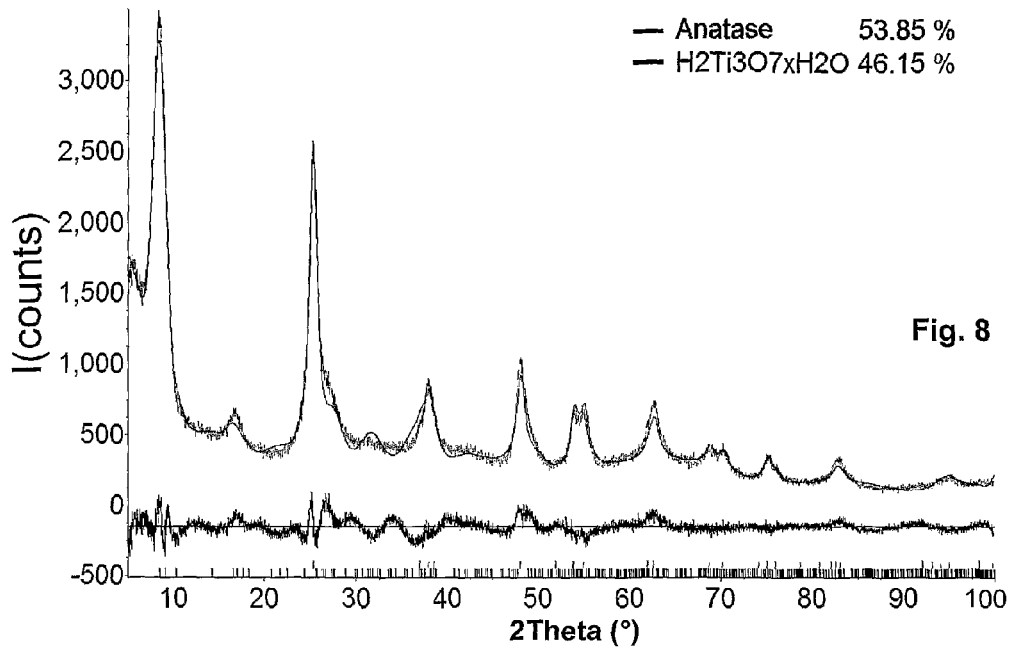
FIG. 8 depicts a Rietveld refinement of the active titania photocatalyst of the invention annealed at 150° C. under vacuum conditions. The observed pattern is presented in grey, the calculated pattern and the difference plot are given in black.
FIG. 9 depicts the atomic parameters of $H_2Ti_3O_7.xH_2O$.
FIG. 10 shows the specific surface areas of nanoparticulate material synthesized at varying conditions of temperature and time.

The selection of the conditions of the solvothermal process, in particular the temperature and the time of exposure to elevated temperature in the solvothermal process can be used to control the amounts of hydrogen titanate and titania in the obtained nanoparticle(s). As illustrated in FIG. 10, at a temperature in the range around 150° C. to around 165° C., including e.g. about 140° C. or about 145° C., an obtained nanoparticle typically has a phase composition of about 35 to 65 percent hydrogen titanate and about 65 to 35% anatase titania, including 40 to 60 percent hydrogen titanate and about 60 to 40% anatase titania or about 40 to 50 percent hydrogen titanate and about 60 to 50% anatase titania. A composition such as within the latter range (40-50/60-50) has been found particularly well suited for methylene blue degradation by the inventors (e.g. the $4^{th}$ entry in FIG. 10 with 46% titanate and 54% titania).

Accordingly, in some embodiments a nanoparticle of the invention has a phase composition of about 10 to 90 percent hydrogen titanate and about 90 to 10% anatase titania including about 25 to 75 percent hydrogen titanate and about 75 to 25% anatase titania, such as about 85% hydrogen titanate and about 15% anatase titania, about 70% hydrogen titanate and about 30% anatase titania, about 50% hydrogen titanate and about 50% anatase titania, about 30% hydrogen titanate and about 70% anatase titania or about 15% hydrogen titanate and about 85% anatase titania.

As will be readily apparent to the skilled artisan, the formation of a photocatalytically active nanoparticle of the invention proceeds by far easier and thereby economically more advantageous than a method of forming titanate materials known in the art. Conventionally, the layered-type protonated titanate was only successfully produced by a tedious energy-consuming process involving mixing, grinding, and calcination of a source of Ti with alkali metal ions at very high temperatures (~1000° C.) to first produce the titanate salt, for example $Cs_2Ti_5O_{11}$. Ion exchange to a protonated form $H_2Ti_5O_1 \cdot xH_2O$ then requires repeated soaking in high-strength HCl over several days [Sasaki et al., 1992, supra]. Heating the particles to 500° C. eventually leads to 100% anatase (tetragonal crystal structure) $TiO_2$ with very high crystallinity. Intermediate thermal treatment causes stepwise crystal water loss (x=3 or less) and shrinkage of the lattice parameter. The possible existence of stable intermediate titanate structures, not necessarily monoclinic or tetragonal, has obvious ramifications for tailoring electronic structure and photocatalytic performance. Other similar protonated materials believed to be in the same family as the material included in a nanoparticle of the invention includes $H_2Ti_5O_{11}.H_2O$ [Yang H G, & Zeng H C, Journal of American Chemical Society (2005) 127, 270] and $H_2Ti_3O_7$ [Zhang, S, et al., Physical Review B (2005) 71, 14104].

As compared to the above mentioned complicated process of synthesizing this class of material, the single step process according to the present invention is simple and involves direct synthesis via low temperature solution based approach. In addition and as explained below, the process of the invention has produced a mixture of two types of semiconductor phases within one nanoparticle: protonated titanate and titania. Yet another unique feature is that a nanoparticle of the invention can be formed at very low temperatures such as about 80-150° C. As a solution based process is generally used, scale up is much easier than in a vacuum based process. Besides the novelty in material and structure, this family of material is not commonly studied for any particular application. The present inventors have identified the nanoparticulate material as having unique photocatalytic activity as shown in the Examples below.

In some embodiments a nanoparticulate photocatalysts according to the invention is deposited on a macroscopic support. Hence, in some embodiments a photocatalyst according to the invention includes one or more nanoparticles as defined above, which is/are immobilized on a solid substrate.

As explained above, the present invention satisfies a need for a photocatalyst that can be used under visible light. The need for environmental remediation processes on a large scale is becoming ever more urgent, especially in anticipation of increasing demand (and potential shortage) of potable water supplies for a growing world population. Among the armoury of advanced oxidation technologies (AOTs), photocatalytic (solar-light-driven) processes are particularly attractive, and photocatalysts have well-demonstrated potential to mineralize harmful organic substances in air and water and even to act as regenerable adsorbents for toxic heavy metal ions, some of these being recovered as photo-deposited metals. Although anatase $TiO_2$ has remained the most popular photocatalyst due to its high catalytic activity and chemical stability, there are some drawbacks associated to it. Its activity is confined to UV light stimulation, representing just a few percent of the solar power spectrum. Its adsorptive properties are also not ideal (Mills, A, & Wang, J J, Photochem. Photobiol. A: Chem. (1999) 127, 123). Since photoreactions take place at or near the catalyst surface, surface adsorption is critical for efficient interfacial charge transfer to and from the target molecules. In contrast, titanate materials have recently been identified as superior adsorbents for, e.g., organic dyes (Tang, Y, et al., Chem. Eur. J. (2010) 16, 7704, published after the priority date of the present application; Baiju, K V, et al., Mater. Lett. (2009) 63, 923). The crystal structure consists of layers of $TiO_6$ octahedra in edge connectivity with protons or alkali metal ions localized between the layers (Sasaki et al., 1992, supra). Various one dimensional structures, including nanotubes, wires, ribbons and fibers, have been obtained via high alkalinity treatment of $TiO_2$ powders and ion exchange. However, these titanates have band-gaps reported to be even larger than that of anatase (Zhu, H Y, et al., J. Am. Chem. Soc. (2005) 127, 6730) and thus remain solely UV-light-responsive.

The invention is further illustrated by the following non limiting examples.

EXAMPLES

Solutions were prepared with analytic-grade reagents and distilled water. The synthesis technique is a direct solvothermal process. Ethanol and acetylacetone (ACAC, 99.5%, Fluka) were mixed in molar proportion of 20:1. Next, titanium isopropoxide (TI, 99.5%, Aldrich) and triethylamine (TE, 99.5%, Aldrich) were added simultaneously dropwise in a molar ratio of 1:4. In other experiments (data not shown) a molar ratio of 1:1 was employed and found to be equally suitable. Lastly, 3 moles of deionized water was added and the mixture was allowed to stir for 30 minutes. Following this, 50 ml of this solution was measured into a 125 ml capacity stainless steel autoclave. The autoclave was then heated in an ambient oven with ramping time of 30 minutes, dwelling at 160° C. for 3 hours for this particular demonstration. In other experiments, the solvothermal reaction was carried out 80° C., 100° C. 130° C., 170° C. and 200° C. (see FIG. 10). Thereafter, the solvent was removed by drying in an oven at 80° C. The extracted powders were cleaned with ethanol and deionized water via centrifuging process.

A range of dwelling temperature from 80 to 200° C. was explored at which varying phase compositions of titanate and anatase can be tuned. The table of FIG. 10 shows the BET results of the respective specific surface area of the photocatalysts synthesized at the varying conditions. The estimated phase ratios of titanate and anatase are also indicated, based on approximations of the surface area.

Figure 3A:
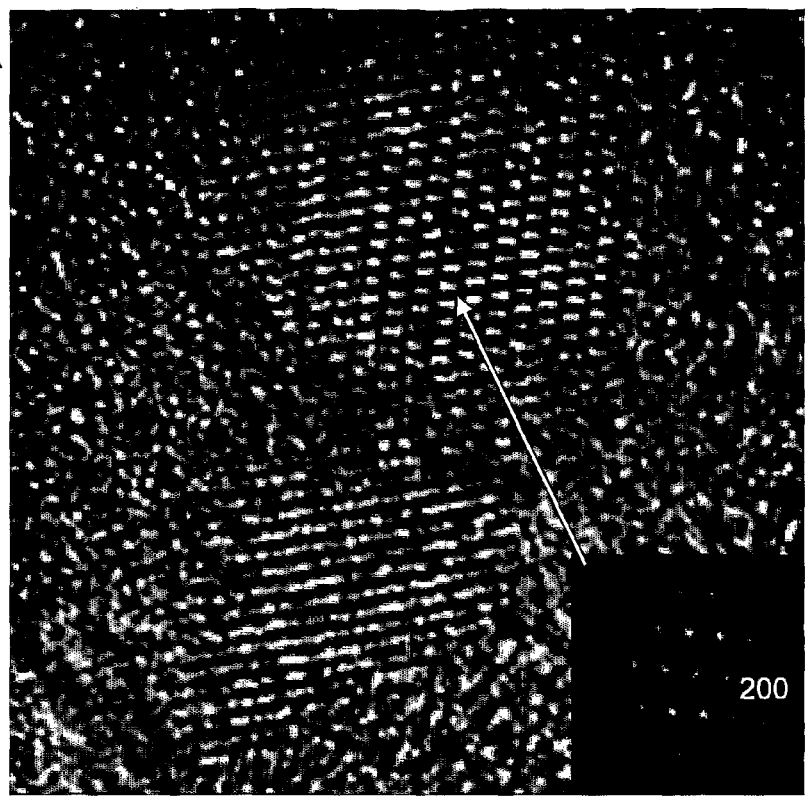
FIG. 3A is a high resolution TEM (transmission electron microscopy) image showing a nanocrystallite of monoclinic (010) phase. The inset shows the corresponding diffraction pattern.
Figure 3B:
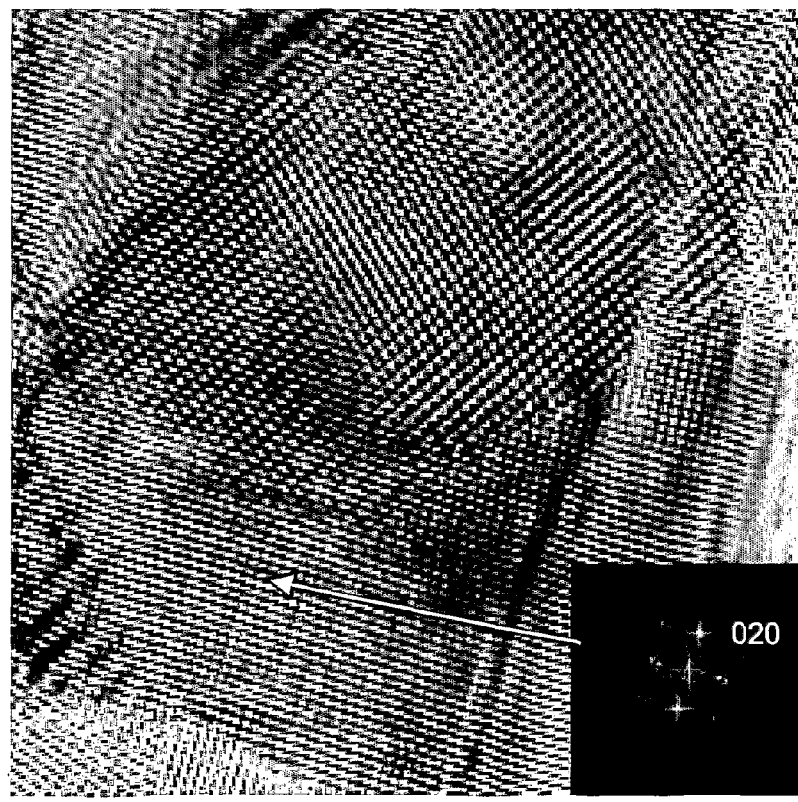
FIG. 3B is a high resolution TEM image showing nanocrystallite of anatase (001) phase. The inset shows corresponding diffraction pattern.
Figure 3C:
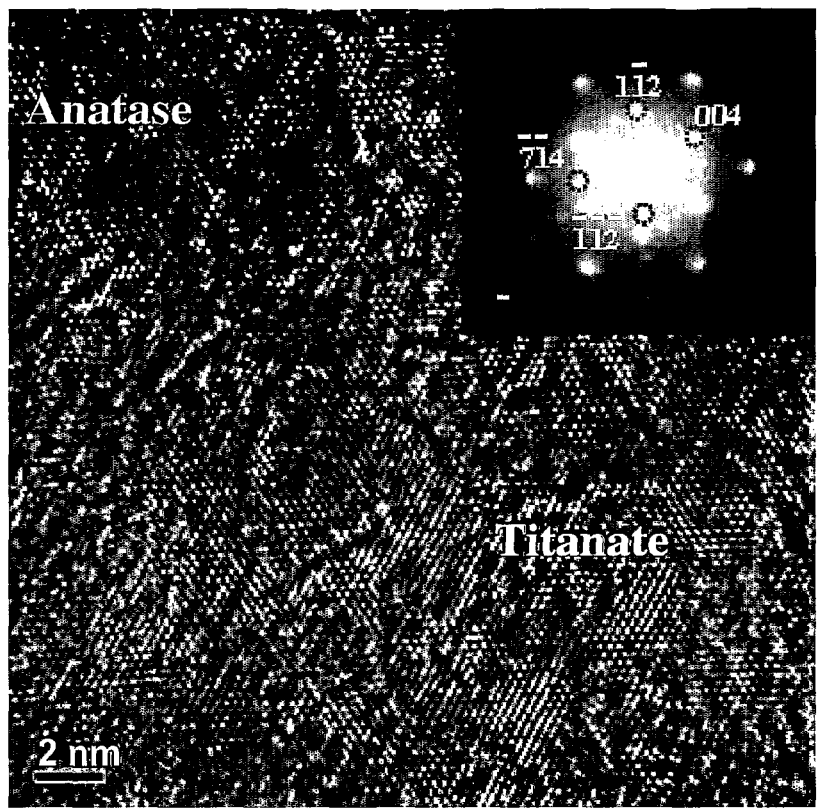
FIG. 3C depicts a high resolution transmission electron microscope (HRTEM) image of an as synthesized nanoparticle. Two phases are distinguishable by colour imaging (cf.
Figure 3D:
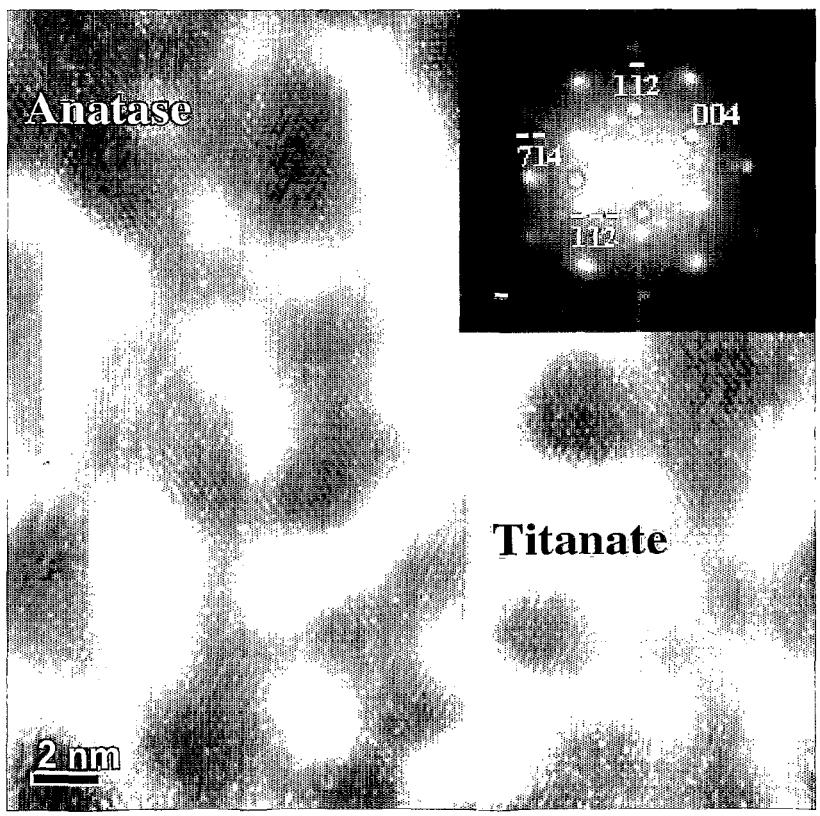
FIG. 3D): anatase (lighter gray) and titanate (darker gray). Inset shows diffraction pattern obtained from FFT of monoclinic titanate (weak spots) and tetragonal anatase phases (strong spots).

The as-synthesized powders are in the 20-30 nm size range, and consist of two distinct phases mutually interdispersed on the 5 nm scale, as confirmed by transmission electron microscopy (TEM) and X-ray diffraction (XRD). FIGS. 3C and 3D show the same high resolution TEM image of a single particle that has both anatase and titanate (bright in FIG. 3D) nanocrystallites that share intimate interfaces. The colour representation of FIG. 3C shows anatase in light gray colour and titanate in darker grey colour. To allow distinguishing the two phases in grey-scale representation more clearly, the saturation of the dark grey has been removed in FIG. 3D, so that dark grey colour and thereby titanate phase appears bright.

A Fast Fourier transformation (FFT) study of the entire area depicted in FIGS. 3C and 3D shows two sets of diffraction patterns (see inset of FIG. 3C). The strong spots are characteristic of tetragonal anatase $TiO_2$, while the weak spots are assumed to be derived from a protonated layered titanate phase. The structure has been predicted based on octahedral re-arrangement from related $A_2Ti_n(O)_{2n+1}.xH_2O$ titanate structures (A=Cs, H) that were previously reported (Sasaki, et al., 1992, supra; Kwiatkowska, J, et al., Acta Cryst. (1987) 43, 258), in conjunction with Rietveld refinement. Without being bound by theory, it is proposed that this titanate phase has a monoclinic structure, with water molecules intercalated between ribbons of edge- and corner-connected $TiO_6$ and $TiO_5$ polyhedra.

Figure 4:
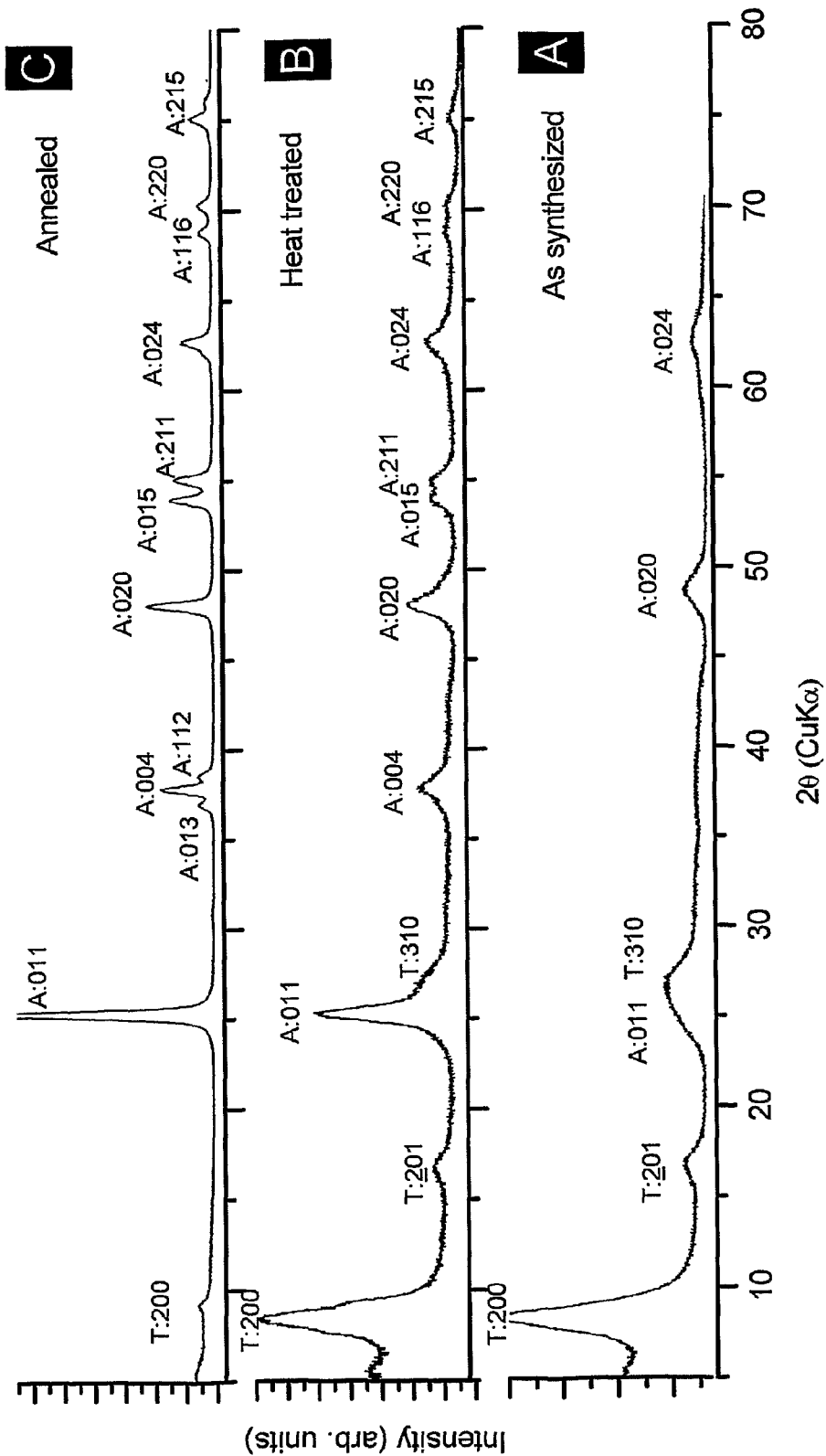
FIG. 4A depicts the X-ray diffraction (XRD) of the as synthesized composite photocatalyst. The formed material is composed of nanocrystalline protonated titanate $H_2Ti_3O_7.xH_2O$ and anatase $TiO_2$.
FIG. 4B depicts the XRD profile of the nanoparticulate material after vacuum heat treatment.
FIG. 4C depicts the XRD profile after annealing, where transformation into anatase is observed. T denotes titanate phase whereas A denotes anatase phase.
Figure 5B:
FIG. 5B illustrates a refined unit cell of nanocrystalline anatase $TiO_2$.
Figure 5B:
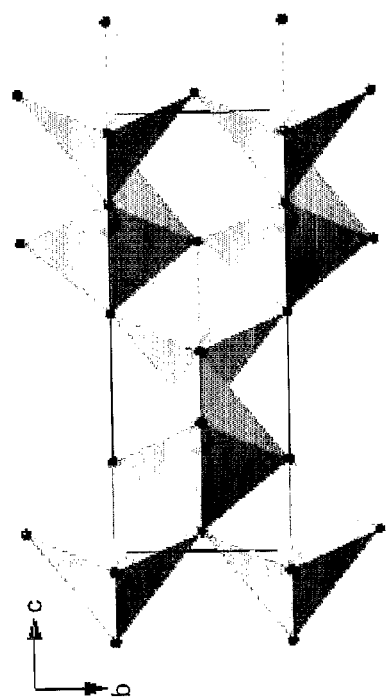
Figure 5A:
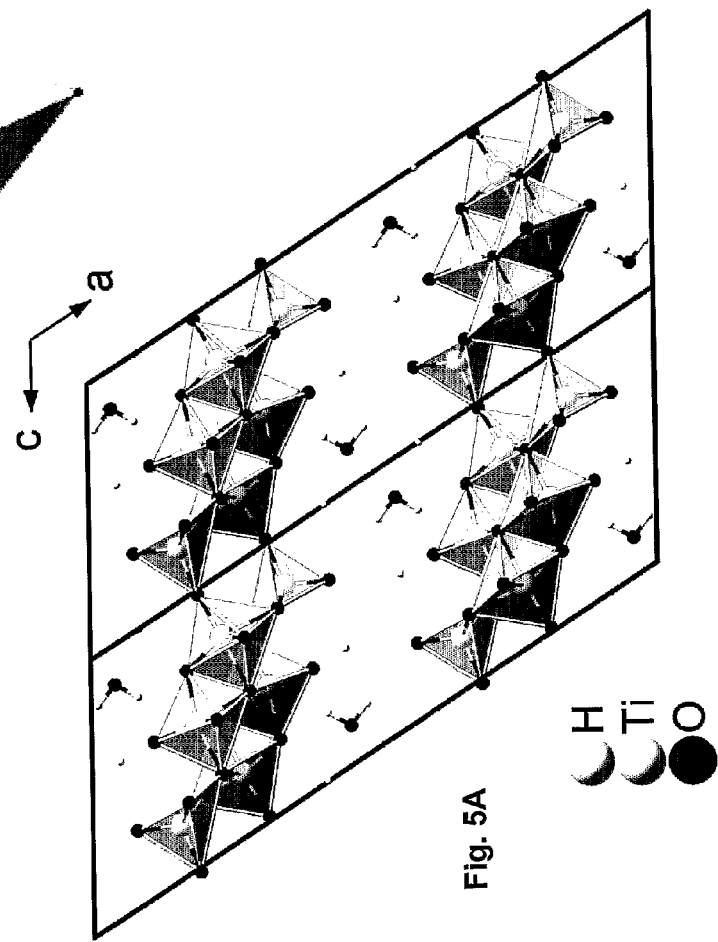
FIG. 5A illustrates a proposed unit cell of protonated layered titanate $H_2Ti_3O_7.xH_2O$. One water molecule is located within the interlayer spacing in this model and calculation.

FIG. 4A shows the XRD pattern of the as synthesized material. The broad peaks are characteristic of nano-sized crystallites, consistent with TEM observation. The first two low-angle peaks may be assigned as reflections from the (200) and (201) planes in the titanate structure. While most titanates exhibit strong diffraction features between 2θ=8 to 16°, assignment of the crystal structure remains somewhat inconclusive. The remaining broad peaks belong to the nanocrystalline anatase phase. To validate this conclusion, the as-synthesized powders were pressed into pellets and vacuum sealed in a quartz tube. The pellets were then heated up to 150° C. for a week and ground into powder. The XRD result of the heat treated powder in FIG. 2B shows the emergence of strong crystalline peaks from 2θ=25.28° onwards which match well to known data of anatase titanium oxide (PDF Card #21-1272). This indicates a growth in crystallinity of the anatase in the presence of a relatively-unaffected titanate phase.

Rietveld refinement was performed on the heat treated sample using the predicted crystal structure of titanate together with the known anatase data. Structural analysis was performed on the basis of powder X-ray diffraction data collected on a Shimadzu 6000 equipped with a Cu—Kα source and a secondary graphite monochromator. The obtained structure was fitted together with anatase onto the powder pattern of the catalyst using the Rietveld method as implemented in Topas. The analysis was heavily impeded by the nanocrystalline and multiphase nature of the material, which resulted in broad, strongly overlapping reflections of both crystalline phases and a structured background, which either indicates the presence of an amorphous phase or massive disorder in both phases. Therefore only the scale factors, the lattice parameters, size broadening, strain broadening and an overall isothermal parameter for each phase were released. FIG. 8 shows the corresponding Rietveld plot.

Figures 6, 7:
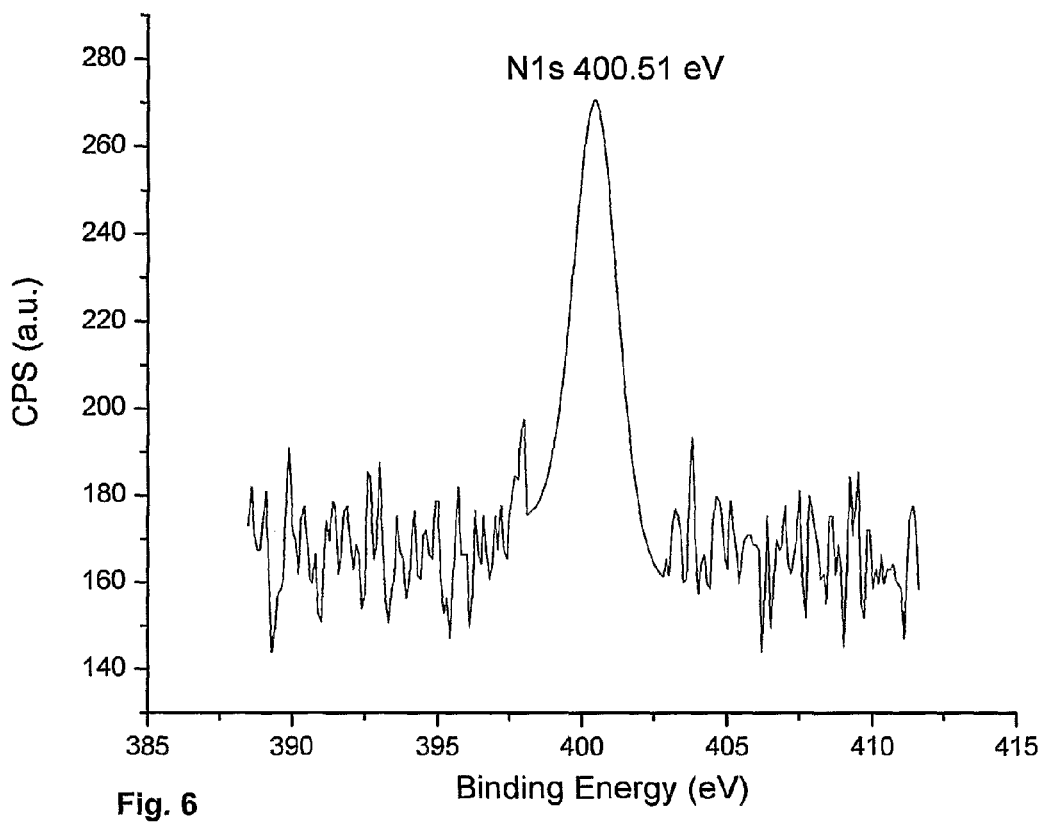
FIG. 6 depicts an X-ray photoelectron spectrum that shows the presence of nitrogen doping N1s in a composite of the invention at 3 atomic percent.
FIG. 7 depicts the Lattice Parameters and Rietveld indices of $H_2Ti_3O_7.xH_2O$.

FIG. 7 shows the lattice parameters and the Rietveld indices and Table S2 the atomic parameters. FIG. 9 shows an excerpt of the proposed structure. It features corner and edge sharing $TiO_6$ and $TiO_5$ polyhedra which form infinite layers in the (0 1 1) plane which are stacked in the [1 0 0] direction. The protons and the water are intercalated between these layers which also may accommodate reactants during the photocatalytic processes. FIG. 9 shows the [0 1 0] projection of the proposed structure of $H_2Ti_3O_7 \cdot xH_2O$. While a more rigorous analysis of the structure would be desirable, this was not possible with the data obtained. It is expect that this will require modeling of disorder achievable by means of pair distribution function. This is beyond the scope of the current study.

Figure 2C:
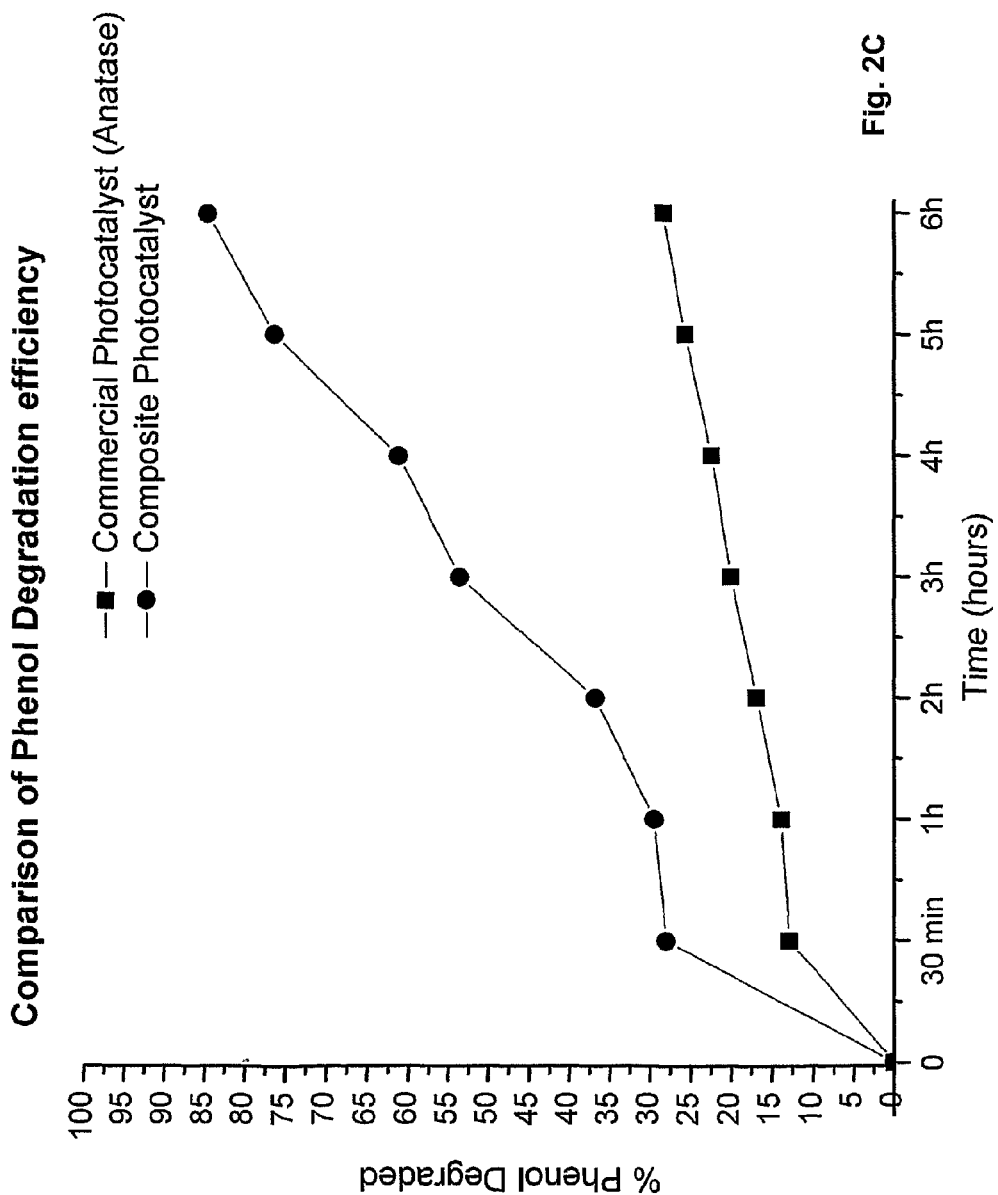
FIG. 2C shows a graph of percentage of phenol reduction versus time by synthesized photocatalyst of the invention (circle) and commercial photocatalyst anatase (square).

Accordingly, after a series of refinement, the titanate structure was determined to be monoclinic (C12/m1 or C2/m) with lattice parameters a=2.493(3) Å, b=0.3708(6) Å, c=1.026(1) Å, and β=123.1(1)°. The number of water molecules was determined using moisture loss calculations from thermogravimetric analysis (TGA). The final unit formula is proposed to be $H_2Ti_3O_7 \cdot xH_2O$. FIG. 2C shows that calcination at 500° C. eventually causes the layered titanate to transform into anatase $TiO_2$.

It is evident that in the as synthesized material a mixture of two types of crystal structure co-exists: one is the protonated titanate and the other nanocrystalline anatase titania. As far as the inventors are aware, there is no report describing such mixed-phase nanoparticles. Using an iterative process of DFT computation and Rietveld refinement, it is proposed that the protonated titanate to have a structure of $H_2Ti_3O_7 \cdot xH_2O$. The structure has a monoclinic C12/m1 configuration with lattice parameters a=24.931, b=3.7079, c=10.255 Å and β=123.11° (cf. FIG. 7). It is found that the particles of this illustrative composite material have a phase composition of approximately 46% protonated titanate and approximately 54% anatase, wherein both the protonated titanate and anatase are nanocrystalline. Diffuse reflectance UV-Vis spectroscopy shows adsorption of light in the ultra-violet and visible range whereas commercial titanium oxide only adsorbs UV light. Nitrogen doping in the composite was detected using X-ray spectroscopy technique. The nitrogen content was found to be approximately 3 atomic percent.

A doping level of ~3 at % nitrogen was typically found in the surface regions of the sample by X-ray photoelectron spectroscopy (FIG. 6). This imparted a distinct brownish tinge suggestive of absorption across the entire visible range. The UV-V is diffuse reflectance spectrum (FIG. 1) confirms that N-doping results in a broad absorption extending from the UV well into the near infrared. Earlier independent reports have also confirmed this coloration due to N-doping in either titanate or titania samples (Liu, G, et al., Chem. Mater. (2008) 21, 1266; Matsumoto, T, Topics in Catalysis (2009) 52, 1584; Joung, S-K, et al. Chem. Eur. J. (2006) 12, 5526).

BET measurements reveal that the as-synthesized dual phase material has a relatively high surface area of ~180 $m^2$/g. This compares to a value of ~50 $m^2$/g for the commercial P25 control. Ostensibly, a high surface area should enhance the mass-specific adsorption properties of the dual phase sample. However, the effect of surface area on photoactivity per se is not so predictable. It is known that there is a trade-off between increasing dispersion and the associated increase in surface defect density. Defects are known to promote electron/hole recombination (Agrios, A, & Pichat, P, J. Photochem. Photobiol. A. Chem. (2006) 180, 130).

Photocatalytic studies involving the use of the composite photocatalyst for photodegradation of methylene blue (MB) dye under visible light (420 nm onwards) was performed. A 450W Xenon lamp (Newport) was used for irradiation with cooling water filter to block IR-rays. Visible light was simulated using filter which allowed wavelengths from 420 nm onwards to pass through. Solutions of the MB dye were prepared in deionized water at 20 ppm concentration and the pH was kept neutral. 10 mg of the photocatalyst powder was dispersed in 100 ml of the Methylene blue solution. Reference photocatalyst powder Degussa P25 $TiO_2$ was also tested under the same conditions for comparison. During the experiment, the suspension remained at ambient temperature and was under constant stirring so as to ensure an aerobic environment for complete dye mineralization (Mills, A, & Wang, J J, Photochem. Photobiol. A: Chem. (1999) 127, 123).

Samples of the solution were taken at time intervals and underwent centrifugation. The samples were tested using UV-Vis spectroscopy (Shimadzu 2500). Methylene blue has a characteristic absorption peak at 662 nm and the absorbance at this peak was tracked at each time interval as C with the initial absorbance at time 0 corresponding to Co. The dark and light experiments show a distinct ability of the composite to both adsorb and degrade methylene blue, providing enhanced photocatalytic effect.

It was found that the composite material exhibited distinctive adsorption of Methylene blue (MB) in the dark and the degradation was speeded up under light irradiation. Results (see FIG. 2) showed that the composite material was far superior over Degussa P25 in photodegradation of MB. FIG. 2A illustrates the change in concentration (C) of MB [normalized to the initial concentration ($C_0$)] with respect to time. Experiments in the dark and under visible light were performed to distinguish the effects of adsorption from complete degradation. P25 showed little or no adsorption in the dark whereas the composite material showed strong adsorption of MB molecules even in total darkness. Under visible light conditions, the degradation reaction was completed in 3.5 hours compared to P25 which was only 20% degraded at a span of 5 hours. The degradation rate using the composite nanoparticles was 20 times that using P25 as shown in the first order degradation function in FIG. 2B. Without being bound by theory the enhanced performance of the composite of the invention is thought to be predominantly due to the simultaneous "adsorption and degradation" action. It is believed that due to the presence of the protonated titanate, MB molecules are strongly adsorbed to the particle surfaces. With the MB molecules on the interface of the particles, electrons and holes released during irradiation can readily react with the MB molecules to break it down into its constituent compounds. Both the anatase titania and protonated titanate may be able to photocatalytically degrade the MB molecules. In addition, the composite photocatalyst has a high surface area of 225 $m^2/g$ compared to P25's 50 $m^2/g$ (the specific surface area was determined by the BET (Brunauer Emmett Teller) technique); which is beneficial since a larger surface area provides more surface active sites for MB degradation. In addition, the composite is able to absorb visible light whereas P25 absorbs primarily UV light as previously shown in UV-Vis diffuse reflectance spectroscopy FIG. 1. The demonstrated performance has clearly shown the potential of this type of particle as efficient photocatalysts for a series of environmental applications.

The photocatalytic capability of the synthesized material was further analysed using phenol as a further test vehicle. The same irradiation setup as above was used. 100 mg of photocatalyst was added to a 100 ml phenol solution with concentration of 50 ppm. Similarly, samples were taken at time intervals and underwent centrifuging. The phenol content in each sample was measured using high performance liquid chromatography (HPLC). Since phenol is a dangerous and common pollutant, it is pertinent that the removal of this substance from the environment be a subject of focus. 50 ppm of Phenol was tested for visible light degradation using the (420 nm onwards) photocatalyst. To measure the efficiency of phenol degradation, high performance liquid chromatography (HPLC) was performed. This equipment analyzes the samples taken at time intervals for the concentration of phenol content. The composite photocatalyst is exceedingly effective in degrading phenol up to 85% at the end of 6 hours visible light irradiation. In comparison, the commercial photo catalyst degrades phenol only up to approximately 25% at the end of the reaction. In phenol degradation, the composite is ~3 times more effective than the commercial powder under visible light irradiation.

A unique composite nanoparticle has been synthesized using a low temperature solution process. The synthesis is a simple one-pot process. The particles have shown promising potential for environmental applications such as detoxification of pollutants. The composite is composed of anatase $TiO_2$ and protonated titanate, both are nanocrystallite. The latter has a monoclinic configuration with large inter-layer spacing. Some studies have been done on similar structures which belong to the family of layered titanates. However, they are mainly high temperature routes which involve complicated synthesis conditions. In addition, the exact atomic coordinates and details of the crystal structures remain unknown. Moreover, not much application work has been explored on these materials and its properties are not well studied. In this example, a direct solvothermal process was used. Ethanol, acetylacetone (ACAC), titanium isopropoxide (TI) and triethylamine (TE) were adjusted in appropriate concentrations. The mixture underwent hydrothermal heat treatment at 160° C. for 2 hours. The final material was obtained in powder form after thorough washing and drying. Extensive characterization was carried out using a variety of techniques such as transmission electron microscopy (TEM), X-ray diffraction (XRD), X-ray absorption fine-structure (XAFs), X-Ray Photospectroscopy (XPS) and ab-initio modeling to investigate the crystal structure of the composite photocatalyst, in particular the novel protonated layered titanate phase. The protonated phase is determined to be $H_2Ti_3O_7.xH_2O$ by a series of iterative Rietveld refinement and density functional theory computation methods. The structure has a monoclinic configuration C12/m1 configuration with lattice parameters a=24.931, b=3.7079, c=10.255 Å and β=123.11° and β=123.11°. Nitrogen doping (at 3%) to the titanate structure has also occurred during the synthesis, which makes it sensitive to the visible light. It is found that the synthesized photocatalyst has a phase composition of 44% protonated titanate and 56% nanocrystallite anatase.

A unique composite nanoparticle has been synthesized using a low temperature solution process. The synthesis is a simple one-pot process. The particles have shown promising potential for environmental applications such as detoxification of pollutants. The composite is composed of anatase $TiO_2$ and protonated titanate, both are nanocrystallite. The latter has a monoclinic configuration with large inter-layer spacing. Some studies have been done on similar structures which belong to the family of layered titanates. However, they are mainly high temperature routes which involve complicated synthesis conditions. In addition, the exact atomic coordinates and details of the crystal structures remain unknown. Moreover, not much application work has been explored on these materials and its properties are not well studied. In this example, a direct solvothermal process was used. Ethanol, acetylacetone (ACAC), titanium isopropoxide (TI) and triethylamine (TE) were adjusted in appropriate concentrations. The mixture underwent hydrothermal heat treatment at 160° C. for 2 hours. The final material was obtained in powder form after thorough washing and drying. Extensive characterization was carried out using a variety of techniques such as transmission electron microscopy (TEM), X-ray diffraction (XRD), X-ray absorption fine-structure (XAFs), X-Ray Photospectroscopy (XPS) and ab-initio modeling to investigate the crystal structure of the composite photocatalyst, in particular the novel protonated layered titanate phase. The protonated phase is determined to be $H_2Ti_3O_7.xH_2O$ by a series of iterative Rietveld refinement and density functional theory computation methods. The structure has a monoclinic configuration C12/m1 configuration with lattice parameters a=24.931, b=3.7079, c=10.255 Å and β=123.11° and β=123.11°. Nitrogen doping (at 3%) to the titanate structure has also occurred during the synthesis, which makes it sensitive to the visible light. It is found that the synthesized photocatalyst has a phase composition of 44% protonated titanate and 56% nanocrystallite anatase.

Diffuse reflectance UV-Vis spectroscopy shows adsorption of light in the ultraviolet and visible range whereas commercial Titanium oxide only adsorbs UV light. Photocatalytic studies involving the use of the composite for photodegradation of methylene blue (MB) dye under near visible light (380-780 nm) were performed. The dual phase anatase/protonated titanate photocatalyst of the invention was shown to synergistically adsorb and degrade methylene blue dye under visible light. Without being bound by theory, visible light sensitivity is thought to be imparted via nitrogen doping.

In particular, it was found that the composite material exhibited distinctive adsorption of MB in the dark and the degradation was speeded up under light irradiation. A commercial photocatalyst Degussa P25 was tested for comparison. Results showed that the composite material was far superior in photodegradation of MB; the degradation rate was about 20 times the rate using P25 under the same light irradiation. This is predominantly due to the simultaneous "adsorption and degradation" action. It is believed that due to the presence of the protonated titanate, MB molecules are strongly adsorbed to the particle surfaces. Both the anatase titania and protonated titanate may be able to photocatalytically degrade the MB molecules. In addition, the nanocomposite has high surface area of 225 $m^2/g$ compared to P25's 50 $m^2/g$; which is beneficial since a larger surface area provides more surface active sites for MB degradation. The demonstrated performance has clearly shown the potential of this type of particles as efficient photocatalysis for a series of environmental applications, such as the separation and immobilization of dangerous species for example radioactive nuclides, and/or more effective photo-reduction of pre-adsorbed heavy metal cations and the degradation of phenol.

One skilled in the art would readily appreciate that the present invention is well adapted to carry out the objects and obtain the ends and advantages mentioned, as well as those inherent therein. Further, it will be readily apparent to one skilled in the art that varying substitutions and modifications may be made to the invention disclosed herein without departing from the scope and spirit of the invention. The compositions, methods, procedures, treatments, molecules and specific compounds described herein are presently representative of preferred embodiments are exemplary and are not intended as limitations on the scope of the invention. Changes therein and other uses will occur to those skilled in the art which are encompassed within the spirit of the invention are defined by the scope of the claims. The listing or discussion of a previously published document in this specification should not necessarily be taken as an acknowledgement that the document is part of the state of the art or is common general knowledge.

The inventions illustratively described herein may suitably be practiced in the absence of any element or elements, limitation or limitations, not specifically disclosed herein. Thus, for example, the terms "comprising", "including", containing", etc. shall be read expansively and without limitation. Use of the term "comprising", "including" or containing" indicates that the listed element(s) is/are required or mandatory, but that other elements are optional and may or may not be present. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by exemplary embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims. In addition, where features or aspects of the invention are described in terms of Markush groups, those skilled in the art will recognize that the invention is also thereby described in terms of any individual member or subgroup of members of the Markush group.

What is claimed is:

1. A composite nanoparticle having a composition comprising a phase of each of protonated titanate and titania (titanium dioxide), wherein the phases of protonated titanate and titania in the composition are uniformly mixed and are mutually inter-dispersed such that there are no morphologically distinct portions, and wherein the nanoparticle comprises 35 to 75 percent protonated titanate and 65 to 25 percent titania and wherein the composition is dried.

2. The nanoparticle of claim 1, wherein the protonated titanate is $H_2Ti_3O_7$ or $H_2Ti_5O_{11} \cdot xH_2O$.

3. The nanoparticle of claim 1, wherein the titania is anatase titania.

4. The nanoparticle of claim 1 having a mixed phase comprising as a first phase protonated titanate having a structure of $H_2Ti_3O_7 \cdot xH_2O$ and as a second phase anatase titania.

5. The nanoparticle of claim 4, wherein the particle has a phase composition of about 40 to 60 percent hydrogen titanate and about 60 to 40 percent anatase titania.

6. The nanoparticle of claim 1, wherein the nanoparticle further comprises a dopant.

7. The nanoparticle of claim 6, wherein the dopant is nitrogen.

8. The nanoparticle of claim 1, wherein the nanoparticle is a nanocrystal.

9. The nanoparticle of claim 1, having photocatalytic activity.

10. The nanoparticle of claim 9, wherein the photocatalytic activity achieves within 3.5 hours at least 25% degradation of a Methylene Blue solution, the Methylene Blue solution having a concentration of 20 ppm, measured at a wave length of 662 nm, at 0.1 mg/ml nanoparticles, after 14 hrs under dark conditions, following visible light irradiation.

11. The nanoparticle of claim 9, wherein the photocatalytic activity achieves, after 14 hrs under dark conditions, within 6 hours of visible light irradiation at least 30% degradation of a phenol solution of 50 ppm at 1 mg/ml nanoparticles.

12. The nanoparticle of claim 1, having a size of about 2 nm to about 200 nm.

13. The nanoparticle of claim 1, wherein the protonated titanate has a crystalline phase with a monoclinic configuration C12/ml with lattice parameters a=24.931, b=3.7079, c=10.255 Å and $\beta$=123.11° and $\beta$=123.11°.

14. A photocatalyst comprising a nanoparticle according to claim 1.

15. The photocatalyst of claim 14, being sensitive to electromagnetic radiation in the wavelength range from about 200 to about 780 nm.

16. The photocatalyst of claim 14, having a surface area of at least about 60 $m^2/g$.

17. A method of decomposing organic and/or biological matter, the method comprising exposing the organic and/or biological matter to visible light or to UV light in the presence of a nanoparticle of claim 1.

18. The method of claim 17, wherein the decomposition is characterized by an activity of at least 30% degradation of a 50 ppm phenol solution within 6 hours of visible light irradiation at 1 mg/ml nanoparticles.

19. The method of claim 18, wherein the phenol degradation is at least about 1.5 times faster than the degradation by $TiO_2$ of P-25 titania.

20. The method of claim 17, wherein the decomposition is characterized by an activity of at least 25% degradation of a 20 ppm Methylene Blue solution within 3.5 hours of visible light irradiation at 0.1 mg/ml nanoparticles.

21. The method of claim 20, wherein the Methylene Blue degradation is at least about 3 times faster than the degradation by $TiO_2$ of P-25 titania.

22. A method of manufacturing a composite protonated titanate/titania nanoparticle, wherein phases of protonated titanate and titania are uniformly mixed and are mutually inter-dispersed such that there are no morphologically distinct portions, and wherein the nanoparticle comprises 35 to 75 percent protonated titanate and 65 to 25 percent titania, the method comprising:

(i) forming under basic conditions a sol, the sol containing an oxide of a single metal, wherein the metal oxide is titanium oxide, wherein forming the titania sol comprises contacting a titanium precursor and a base in a suitable polar solvent, wherein the titanium precursor and the base are used in a molar ratio from about 10:1 to about 1:10, and (ii) heating the sol under solvothermal conditions, wherein the sol is heated at a temperature within the range between about 100° C. and about 165° C. for a period of about 1 to about 3 hours and drying the obtained composition.

23. The method of claim 22, wherein the base is triethylamine.

24. The method of claim 22, wherein the titanium precursor is a titanium alkoxide.

25. The method of claim 22, wherein the temperature is within the range between about 120° C. and about 160° C.

* * * * *